United States Patent
Lian (10) Patent No.: US 10,019,054 B2
(45) Date of Patent: *Jul. 10, 2018

(54) REMOTE DRIVING WITH A VIRTUAL REALITY SYSTEM

(71) Applicant: Thunder Power New Energy Vehicle Development Company Limited, Central (HK)

(72) Inventor: Po-Han Lian, Taichung (TW)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,838

(22) Filed: Dec. 13, 2016

(65) Prior Publication Data

US 2017/0192497 A1    Jul. 6, 2017

Related U.S. Application Data

(63) Continuation of application No. 14/983,620, filed on Dec. 30, 2015, now Pat. No. 9,568,995.

(51) Int. Cl.
*G06F 3/01*    (2006.01)
*G05D 1/00*    (2006.01)
(Continued)

(52) U.S. Cl.
CPC .......... *G06F 3/011* (2013.01); *G05D 1/0044* (2013.01); *G06F 3/012* (2013.01); *G06F 3/013* (2013.01); *G06T 11/60* (2013.01); *G09B 9/05* (2013.01)

(58) Field of Classification Search
CPC .......... G06F 3/011; G06F 3/012; G06F 3/013; G06F 3/014; G06F 3/015; G06F 3/048; G06T 19/006; G06T 19/003; G06T 2210/61; G06T 2215/00; G06T 2215/16; G06T 15/00; G06T 15/005; G06T 15/20; (Continued)

(56) References Cited

U.S. PATENT DOCUMENTS 3,374,845 A * 3/1968 Selwyn ................. A61F 4/00
                                                 180/316
8,190,295 B1 * 5/2012 Garretson ............ G05D 1/0038
                                                 700/245
(Continued)

FOREIGN PATENT DOCUMENTS

WO    01/61672 A1    8/2001

OTHER PUBLICATIONS

Kelly et al., "Real-Time Photorealistic Virtualized Reality Interface for Remote Mobile Robot Control," Springer-Verlag Berlin Heidelberg 2011, 16 pages.
(Continued)

*Primary Examiner* — Thomas G Black
*Assistant Examiner* — Sara J Lewandroski
(74) *Attorney, Agent, or Firm* — Kilpatrick Townsend & Stockton LLP (57) ABSTRACT

A method and system for facilitating a user drive an automobile remotely in real-time through a virtual reality system is disclosed. The virtual reality environment may present real-time road conditions, weather condition, automobile information, and/or any other information regarding driving of the automobile in real time.

18 Claims, 7 Drawing Sheets

(51) Int. Cl.
  *G06T 11/60* (2006.01)
  *G09B 9/05* (2006.01)
(58) Field of Classification Search
  CPC ... G06T 15/205; A63F 13/42; G08C 2201/00;
         G08C 2201/30; G08C 2201/32; G08C
         2201/34; G08C 2201/93; G08C 2201/91;
         G05D 1/0011; G05D 1/016; G05D
         1/0038; G05D 1/0044; G05D 1/0276
  See application file for complete search history.

(56) References Cited

U.S. PATENT DOCUMENTS

| | | | | |
|---|---|---|---|---|
| 8,195,343 | B2* | 6/2012 | Lin | G01S 19/49 |
| | | | | 340/539.13 |
| 9,024,972 | B1 | 5/2015 | Bronder et al. | |
| 2004/0252862 | A1* | 12/2004 | Camus | G06K 9/00201 |
| | | | | 382/104 |
| 2005/0206657 | A1* | 9/2005 | Arcas | G01C 21/36 |
| | | | | 345/660 |
| 2010/0070176 | A1* | 3/2010 | Feyereisen | G01C 23/005 |
| | | | | 701/448 |
| 2010/0100256 | A1* | 4/2010 | Jurmain | B25J 3/04 |
| | | | | 701/2 |
| 2010/0245573 | A1* | 9/2010 | Gomi | B60R 1/00 |
| | | | | 348/148 |
| 2011/0066262 | A1* | 3/2011 | Kelly | G05B 23/0267 |
| | | | | 700/90 |
| 2012/0287284 | A1* | 11/2012 | Jacobsen | G06F 1/163 |
| | | | | 348/158 |
| 2013/0173089 | A1* | 7/2013 | Bernstein | A63H 30/04 |
| | | | | 701/2 |
| 2013/0293582 | A1* | 11/2013 | Ng-Thow-Hing | G06T 19/006 |
| | | | | 345/633 |
| 2013/0332057 | A1* | 12/2013 | Moore | G08G 1/0962 |
| | | | | 701/118 |
| 2015/0084988 | A1* | 3/2015 | Lee | G02B 27/01 |
| | | | | 345/633 |
| 2015/0153312 | A1* | 6/2015 | Gonzalez | G01D 5/00 |
| | | | | 73/23.2 |
| 2015/0260474 | A1* | 9/2015 | Rublowsky | F41A 33/00 |
| | | | | 434/16 |
| 2015/0317834 | A1 | 11/2015 | Poulos et al. | |
| 2015/0355805 | A1* | 12/2015 | Chandler | G06F 3/0482 |
| | | | | 715/784 |

OTHER PUBLICATIONS

U.S. Appl. No. 14/983,620, filed Dec. 30, 2015, Non-Final Rejection dated Apr. 15, 2016, all pages.
U.S. Appl. No. 14/983,620, filed Dec. 30, 2015, Notice of Allowance dated Sep. 26, 2016, all pages.
European Search Report for EP 16207263 dated Mar. 27, 2017, 8 pages.
European Search Report for EP 16202369 dated Apr. 6, 2017, all pages.
Office Action for EP16207263 dated Feb. 1, 2018, 7 pages.

* cited by examiner

REMOTE DRIVING WITH A VIRTUAL REALITY SYSTEM

CROSS-REFERENCE TO RELATED APPLICATION

The present application is a continuation of U.S. Non-provisional patent application Ser. No. 14/983,620, filed Dec. 30, 2015, the entire disclosure of which is hereby incorporated by reference in its entirety for all purposes.

FIELD

The present disclosure generally relates to facilitating a user to remotely drive an automobile through a virtual reality environment,

BACKGROUND

Driving simulation is generally known in the art. Typically, a conventional driving simulator employs a computer that executes a driving program, which typically implements and presents driving conditions to a user on a display device. The conventional driving simulator typically provides a physical steering wheel and other controls such as a gas pedal and a brake pedal. Through the controls, the user is enabled to "drive" imaginarily in the driving condition presented to the user by the driving program.

Virtual Reality (VR) systems immerse a user in a three-dimensional virtual world. Typically, the user wears a head-mounted device (HMD) that presents the user views of the three-dimensional world rendered by a computing device associated with the HMD, while blocking all other visual stimulation. The traditional VR systems typically track the user's head or, as the case may be, the user's viewpoint, so that the graphics of the three-dimensional world can be rendered from the user's viewpoint. When the user changes his or her position or moves his or her head, the view of the three-dimensional virtual world displayed on the HMD is changed accordingly.

BRIEF SUMMARY

Embodiments of the present disclosure can facilitate a user to drive an automobile remotely in real-time. The user may be enabled do so through a virtual reality environment. The virtual reality environment may present real-time road conditions, weather condition, automobile information, and/or any other information regarding driving of the automobile in real time. The user may be facilitated to provide inputs to drive the automobile through, for example, a head mount display (HMD), a physical steering wheel and/or any other controls.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
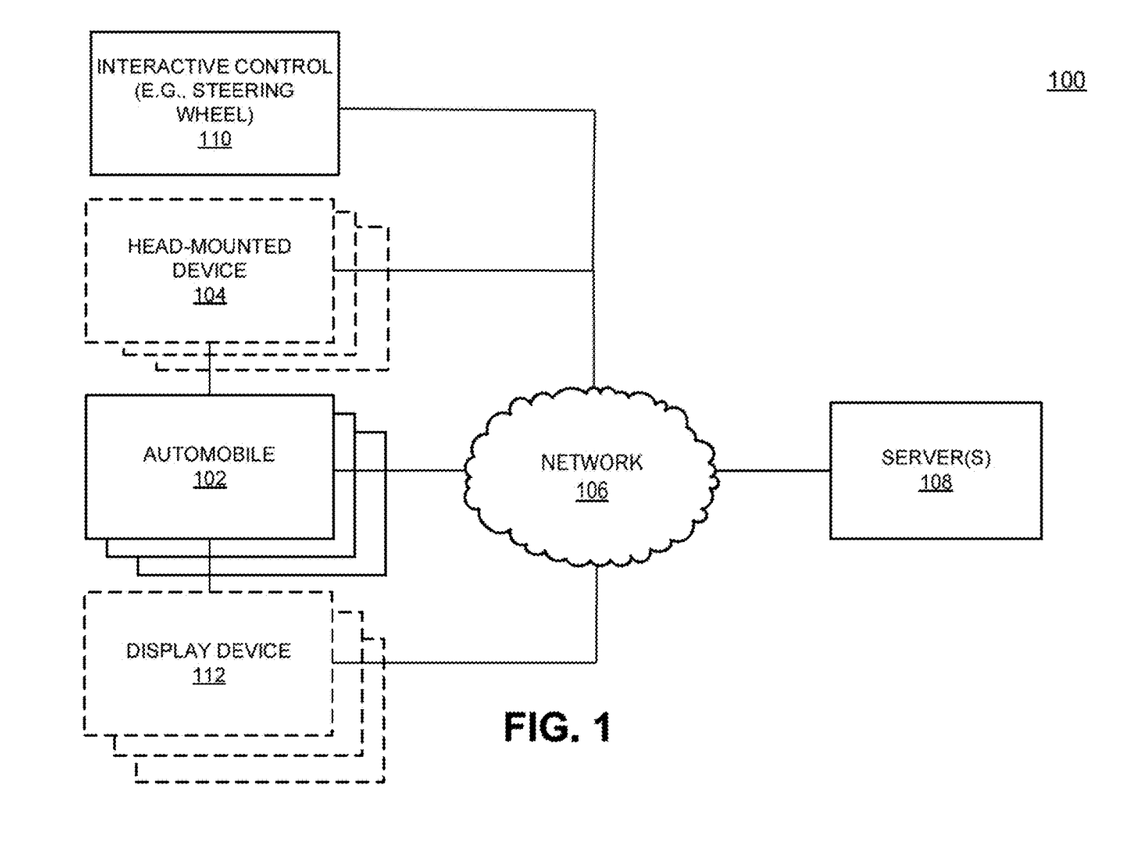
FIG. 1 is a diagram generally illustrating a system for facilitating a user to manipulate a VR environment in accordance with the present disclosure.

FIG. 1 illustrates an example of a system 100 that can render a view of a virtual reality (VR) environment. The virtual reality environment rendered by system 100 may present various information such as automobile information, road condition, weather information, and/or any other real-time information regarding the driving of the automobile. As shown, system 100 may include a server 108 (e.g., one or more server computers) that is configured to implement and provide the virtual reality environment. As shown, system 100 may include one or more automobiles 102, one or more head-mounted devices 104, one or more display device 112, one or more interactive controls 110 or other suitable interactive device(s).

Server 108 can be configured to implemented an instance of the VR environment and to determine view information defining views of the VR environment. The view information determined by the server 108 can be communicated (e.g., via streaming, via object/position data, and/or other information) from server 108 to HMD 104 and/or display devices 112 for presentation to users. The view information determined and transmitted by server 108 can correspond to a location within an automobile 102 (e.g., a location within the automobile from which the view is taken), a zoom ratio, a point-of-view, and/or view parameters.

The instance of the VR environment can comprise a simulated space that is accessible by a user via the HMD 104, the display devices 112, the interactive controls 110 such as steering wheel, gas pedal, brake pedal, gear shift and/or any other automobile controls. The views of the VR environment can be presented to the user via the display devices 112 or may be presented to the user directly on the HMD 104. The simulated space can have a real-world topography, express ongoing real-time interaction by one or more users, and/or include one or more objects positioned within the topography that are capable of locomotion within the topography. The topography can be a 3-dimensional topography. The topography can include dimensions of the space, and/or surface features of a surface or objects that are "native" to the space. In some instances, the topography may describe a surface (e.g., a ground surface) that runs through at least a substantial portion of the space. In some instances, the topography can describe a volume with one or more bodies positioned therein (e.g., a simulation of gravity-deprived space with one or more celestial bodies positioned therein).

The above description of the manner in which views of the VR environment are determined by the server 108 is not intended to be limiting. Server 108 can be configured to express the VR environment in a more limited, or more rich, manner. For example, views determined for the VR environment may be selected from a limited set of graphics depicting an event in a given place within the VR environment. The views can include additional content (e.g., text, audio, pre-stored video content, and/or other content) that describes particulars of the current state of the place, beyond the relatively generic graphics.

The server 108 can communicate the view information with the interactive devices such as HMD 104 and interactive controls 110 in a client/server architecture via a network 106 as shown. In some embodiments, the network 106 may include one or more cloud infrastructure systems that provide cloud services. A cloud infrastructure system may, for example, be operated by a service provider. In some aspects, services provided by the cloud network may include a host of services that are made available to users of the cloud infrastructure system on demand, such as remote rendering of media content. Services provided by the cloud infrastructure system can dynamically scale to meet the needs of its users. However, this is not intended to be limiting. In some examples, the network 106 may comprise a wired network, a wireless network or a combination of both.

The network 106 can comprise one or more computers, servers, and/or systems. In some embodiments, the computers, servers, and/or systems making up the network 106 are different from a customer's on-premises computers, servers, and/or systems. For example, the network 106 may host an application, and a user or customer may order and use the application via a communication network (e.g., network 106). In some examples, the network 106 may host a Network Address Translation (NAT) Traversal application to establish a secure connection between a service provider of the network and one or more of the interactive devices, such as the automobile 102, head-mounted device 104, or display device 112. A separate secure Transmission Control Protocol (TCP) connection may be established for communicating between the aforementioned components and the server 108. In some embodiments, each secure connection may be kept open for an indefinite period of time so that the cloud network can initiate communications with each respective interactive device at any time. Various protocols may be used to establish a secure connection between each network device and the server 108, including Session Traversal Utilities for NAT (STUN), Traversal Using Relay NAT (TURN), Interactive Connectivity Establishment (ICE), a combination thereof, or any other appropriate NAT traversal protocol.

In some cases, communications between the network 106 and interactive devices may be supported using other types of communication protocols. Such protocols may include a Hypertext Transfer Protocol (HTTP) protocol, a Hypertext Transfer Protocol Secure (HTTPS) protocol, or other suitable communication protocol. In certain embodiments, the cloud network may include a suite of applications, middleware, and database service offerings that are delivered to a customer in a self-service, subscription-based, elastically scalable, reliable, highly available, and secure manner.

The server 108 can receive a user request for displaying a view of the VR environment on head-mounted device 104 and/or display device 112. For example, a user input can be received from the HMD 104 for displaying a view of the VR environment—e.g., the user may tilt his head to look right. Upon receiving such a request, the server 108 can provide appropriate view information by rendering one or more images representing a view requested by the user and sending the rendered images to HMD 104 or display devices 112 for presentation. In implementations, the server 108 can include hardware and software for a rendering algorithm to rendering such images. The rendering algorithm can utilize one or more scene files that contain objects in a defined language or data structure. For example, the scene file may include a description of the virtual scene that includes geometries, viewpoints, textures, lighting, and shading information of different VR environments, virtual backgrounds, and virtual objects in the scene. Any suitable rendering algorithm can be used to process the scene file to render the images of the view requested by the user. In some examples, a rendering algorithm may use one or more of rasterization techniques, ray casting techniques, ray tracing techniques, radiosity techniques, or other suitable techniques for rendering an image. In one example, the rendering algorithm used by the server 108 may include rasterization with deferred shading and dynamic global illumination. In some embodiments, the server 108 may include a graphics processing unit (GPU) in addition to a central processing unit (CPU) for rendering the images of the media content item 110.

The automobile 102 can include any motor vehicle for transportation. The automobile 102 can be equipped with various sensors and/or information capturing devices. Examples of sensors that can be included in the automobile may include speed, depth, infrared, ambient temperature, pressure, brake force, collision, electric power consumption, battery level, and/or any other sensors. Examples of information capturing devices may include one or more cameras, voice recorders, navigation device (e.g., capturing a geo-location of automobile 102), and/or any other information capturing devices. Information received by the sensors and/or the information capturing devices in the automobile can be transmitted to the server 108 for rendering frames virtual environment that represents real-time driving conditions of automobile 102.

In some examples, as is the case in this example, the head-mounted device 104 may include a head-mounted virtual reality device, such as virtual reality goggles or glasses. In another example, the head-mounted device 104 may include three-dimensional glasses. In some examples, an interactive device may include a display device 112. For example, the display device 112 may include a television, a desktop or laptop computer, an immersion system or cave, or other suitable display device. In some examples, as in this example, system 100 can include a display device 112. For example, the display device 112 can include a television, a projection screen, a LCD/OLED wall, or any other display device. The display device 112 can be used to present one or more views of the virtual environment rendered by server 108.

Figure 2:
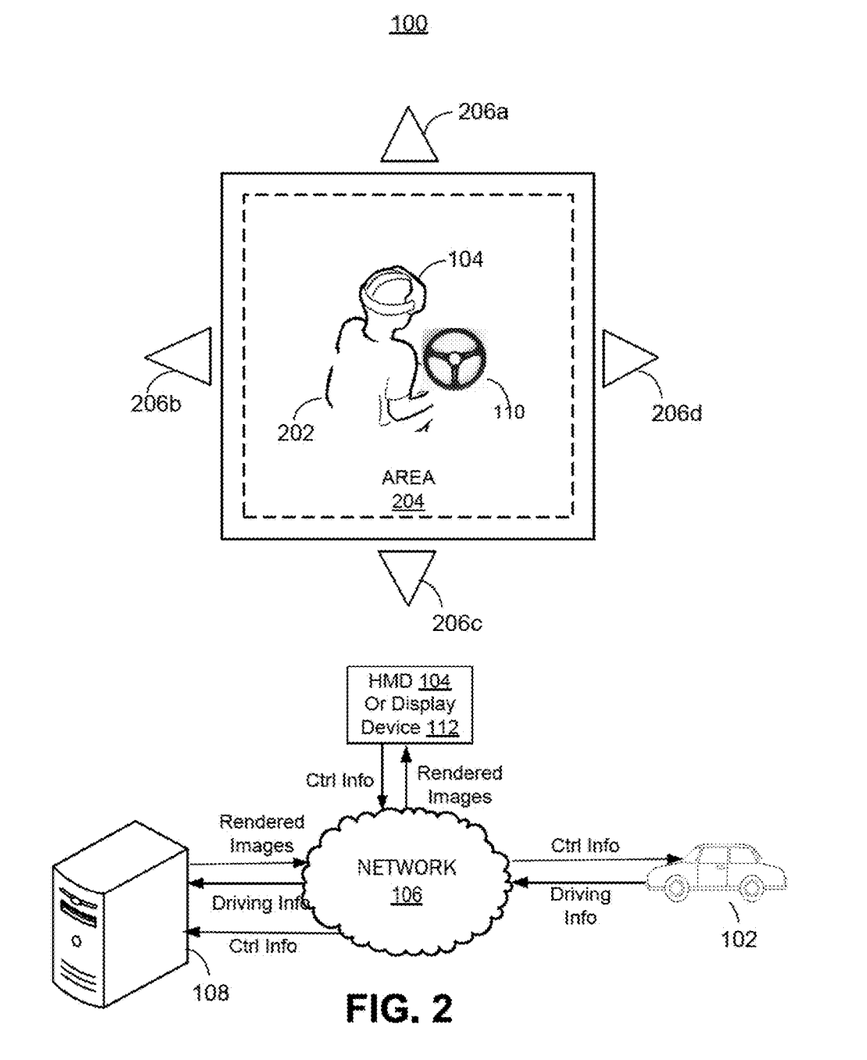
FIG. 2 illustrates an example of the system shown in FIG. 1 in accordance with the present disclosure.

With the general architecture of the system 100 for facilitating a user to manipulate an automobile through a VR environment having been described, attention is now directed to embodiments of the system 100 with an emphasis on receiving user inputs for such manipulation. FIG. 2 illustrates an example of system 100 for facilitating a user to manipulate an automobile 102 through a VR environment in real-time. As mentioned above, automobile 102 may include one or more sensors located within automobile 102 and/or on automobile 102. The sensors may be used to track the movement and position of the automobile 102 in real-time. The sensors may be used to acquire various information regarding the automobile 102 at a given time, such as speed, driving direction, brake force, engine running mode, battery level, power consumption, air temperature within automobile, and/or any other information regarding automobile 102. As also mentioned above, the automobile 102 can include one or more information capturing devices to capture a geo-location of automobile 102, a position of automobile 102 with respect to traffic lanes, traffic information regarding any vehicle that is within the proximity of automobile 102, and/or any other information. For purposes of this application, the above-mentioned various information acquired by the sensors and the information capturing device may be referred to as "driving information" herein.

In some implementations, automobile 102 can be configured to communicate driving information to server 108. In some examples, the communication of driving information from the computing device 102 to the server 108 can be achieved via a network 106. The network 106 may be wireless, wired, or a combination of both.

In some examples, automobile 102 may establish a direct communication link with one or more of a server 108. For example, automobile 102 may establish a Bluetooth™ link, a Zigbee™ link, or other communication link with server 108. Following establishment of the communication link, server 108 may receive driving information from automobile 102. Upon receiving the driving information from automobile 102, server 108 may render one or more images representing a real-time VR view of the automobile 102. Server 108 can then send the rendered images to HMD 104 and/or display device(s) 112 for presentation to the user.

In this example, it is shown that the rendered image of the VR by server 108 may be transmitted to the HMD 104 for presentation to user 202. As shown, the user 202 may be enabled to control one or more interactive control components 110, such as the steering wheel 110 shown in FIG. 2. As mentioned above, the user 202 may be enabled to send control information by maneuvering the interactive control components 110 to automobile 102. The control information may include one or more control commands, for example, without limitation, increasing, decreasing, or maintaining the speed of automobile 112, change a lane for automobile 112, making a turn for automobile 112, and/or any other control commands. Through HMD 104, the user 202 may be enabled to change the view of the VR rendered by server 108. For example, the user may tilt his head to his/her right to look right out of a window of automobile 102. In that example, server 108 will detect a movement of the HMD 104 and re-determine a view of the VR for presentation. For example, when the user 202 tilt his/her head to the right, the server 108 can re-render the view images to reflect a view seen by the driver of the automobile 102. The server 108 may then re-determine the VR view in response to the user's moving his/her neck. As shown in FIG. 2, the system 100 can area 204 in which user 202 is virtually controlling the automobile 102. As shown, area 204 can include one or more sensors 206, such as sensors 206a-d shown, located in the area 204. The sensors 206 can include, for example, cameras, depth sensors, infra-red sensors, light sensors, or other suitable sensors. The sensors 206 can be used to track the movement and positioning of a user 202 within the area 204. As shown, the user 202 may wear a HMD 104 and control the steering wheel 110 at the same time. However, this is not intended to be limiting. It should be understood the user 206 is not required to wear HMD 104 to manipulate a view of the VR environment for display via the computing device 102. In some other examples, the user 206 may use the computing device 102 to manipulate a view of the VR environment displayed on another user's HMD 104

Figure 3:
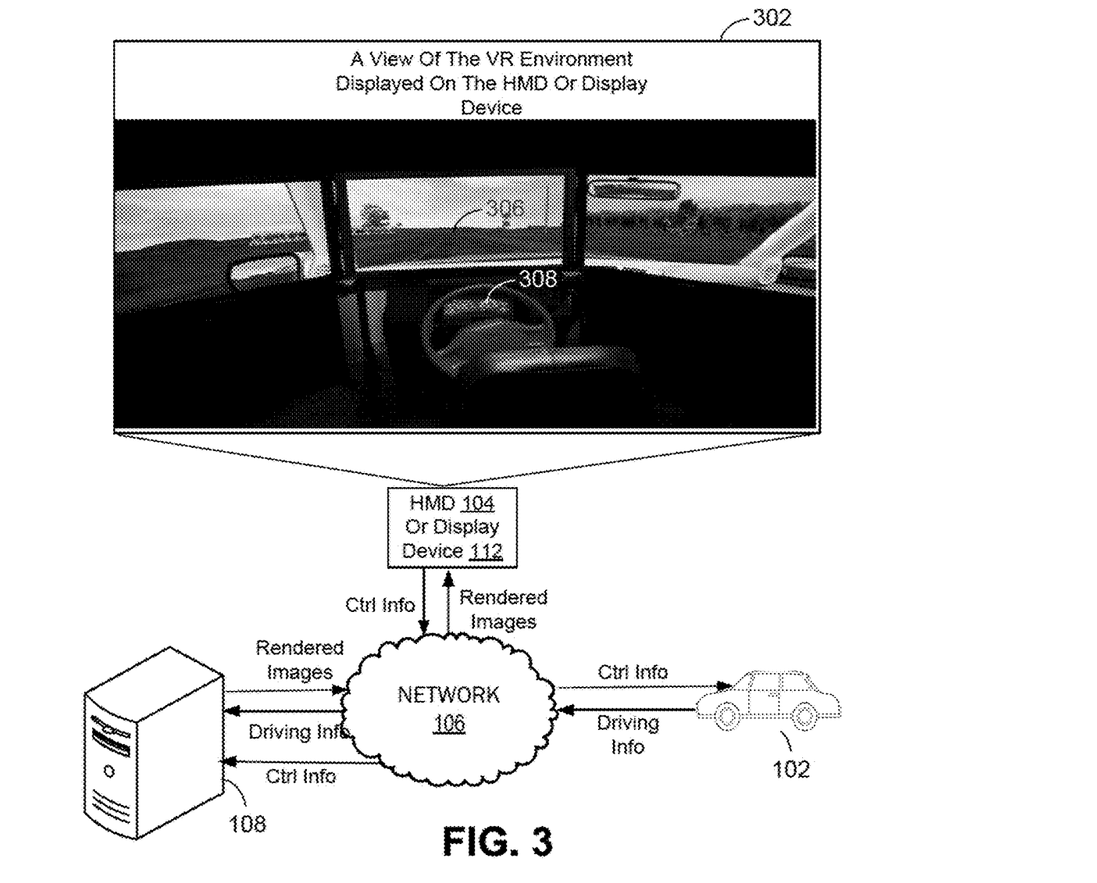
FIG. 3 illustrates an example of a VR view that can be presented to the user to enable the user to manipulate an automobile remotely in real-time.

FIG. 3 illustrates an example of a VR view that can be presented to the user to enable the user to drive an automobile remotely in real-time. As shown in this example, a VR view 302 may be implemented by server 108 based on the driving information received from automobile 102. As shown, the VR view 302 may be taken from a perspective of a virtual driver in the automobile 102. The VR view 302 can provide a user, such as the user 202 shown in FIG. 2, an immersive experience as if the user 202 was in the automobile 102. It should be appreciated the VR view 302 is distinguished over real-time video feed presented on a display device. The VR view 302 is a simulated representation of driving conditions of automobile 102 at a given instance of time. It is rendered based on driving information acquired from automobile 102 and scene files.

For example, in some implementations, a database of pre-rendered scene files can be stored. The pre-rendered scene files can represent realistic road conditions for a city, a region, a county, a country, a continent. For instance, pre-rendered scene files representing the entire state of California can be stored. In one embodiment, without limitation, the VR view 302 is rendered by selecting one or more scene files corresponding to a geo-location of the automobile 102 at the given instance of time. In that embodiment, real-time database(s) of traffic, weather, accidents, and/or any other conditions is also stored. Based on the geo-location of the automobile 102, the above-mentioned condition information for a vicinity within the geo-location of the automobile 102 can be retrieved. For example, the position information regarding other automobiles around the automobile 102 can be retrieved from a database storing live traffic information for all automobile. As another example, weather information regarding weather condition within an area the automobile 102 is traveling in can be retrieved based on the geo-location of automobile 102 at the given instance of time. These information is then used to by server 108 to implement the VR view 302 by rendering proper details to the selected scene files.

The VR view 302 may be taken based on a position of HMD 104. The HMD 104 may be configured to capture head and neck movement of the user 202. Referring back to FIG. 2, sensors 206a-d can be positioned around area 204 to capture movement information regarding such movements by user 202. The movement information can be streamed to server 108 in real-time. Based on the head and neck movement information regarding the user 202 at the given time instance, server 108 may determine an posture of the user 202, which may include determining an eye gaze of the user 202. Based on the determined posture information, server 108 can determine a direction at which the user 202 is looking at in the virtual environment. With this determination, server 108 can determine a location within the automobile 102 the VR view 302 should be taken at the given time instance. It should be understood the above description for determining the location of VR view 302 is merely illustrative. Other examples are contemplated. For instance, one or more on-body sensors can be place on user 202 to track his/her movements. The movement information captured by the on-body sensors can be streamed to server 108 for determining the view location or to improve the user head and neck movement information captured by the one or more sensors.

In this example, the VR view 302 is a three panel view representing a windshield of the automobile 102. As shown, the area details of the road 306 that automobile 102 is traveling in are depicted in the VR view 302. As shown, the VR view 302 is focusing on the road 306. As also shown, various driving information may be displayed on an instrument panel 308. In some examples, the instrument panel 308 can be a physical panel that displays driving information, as it is the case when VR view 302 is presented on display device 112. As still shown, a physical steering wheel 304 can be provided to enable user 206 to manipulate automobile 102 in real-time.

Figure 4:
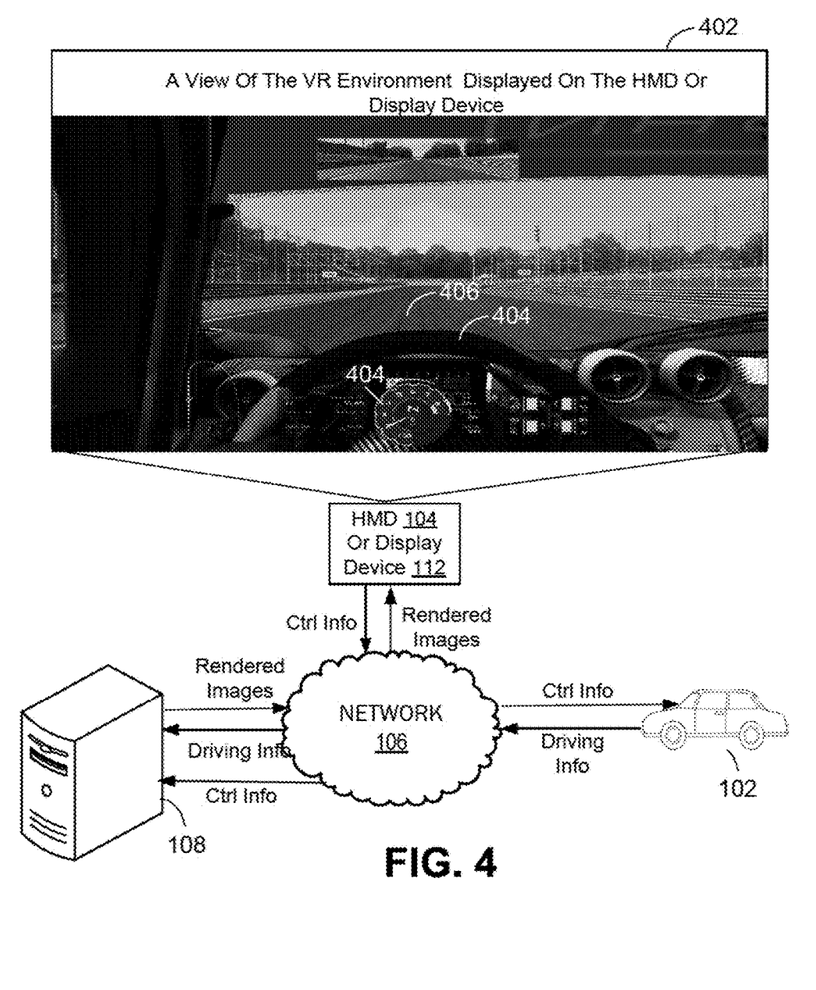
FIG. 4 illustrates another example of a VR view that can be presented to the user to enable the user to drive an automobile remotely in real-time.

The instrument panel 308 can be part of VR view 302 in some examples, as it is the case when the VR view 302 is presented on HMD 104. FIG. 4 illustrates another example of a VR 402 view that can be presented to the user through a HMD 104. As shown in this example, the VR view 402 can be presented on a HMD 104 or display device 112. The VR view 402 can include conditions of a road 406 the automobile 102 is traveling in. The VR view 402 can include a virtual instrument panel 408 displaying various driving information. As also shown, the VR view 402 can include a virtual steering wheel 404 to enable the user to manipulate the automobile 102. In one embodiment, the virtual steering wheel 404 is controlled by user 206 through a physical steering wheel such as the physical steering wheel 110 shown in FIG. 2.

Figure 5:
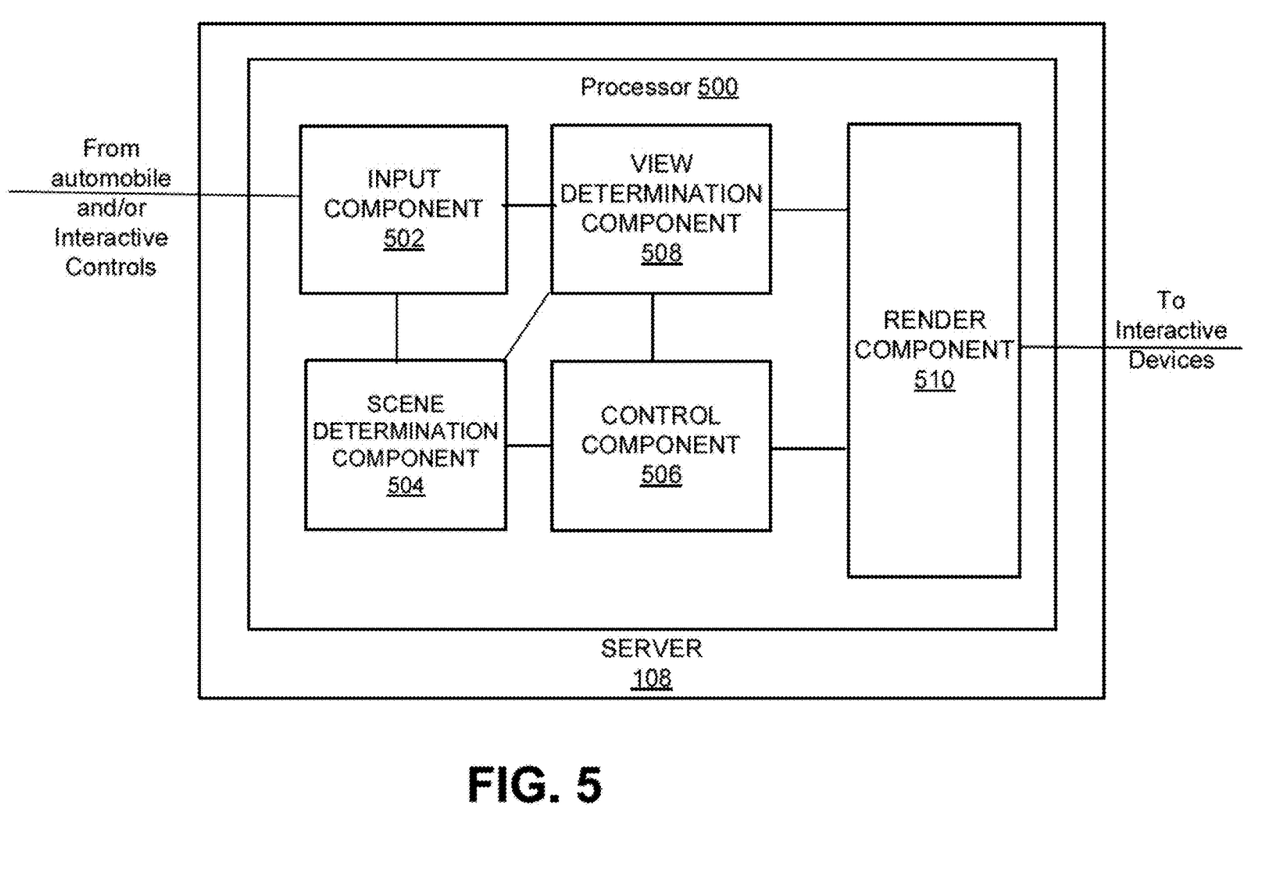
FIG. 5 illustrates one exemplary implementation of a server shown in FIG. 1 in accordance with one embodiment of the disclosure.

FIG. 5 illustrates one exemplary implementation of server 108 in accordance with one embodiment of the disclosure. It will be described with reference to FIG. 1. As shown, server 108 may comprise one or more of a processor 500. The processor 500 may comprise a input component 502, a scene determination component 504, a control component 506, a view determination component 508, a render component 510, and/or any other components. The input component 502 can be configured to receive inputs provided by automobile 102 and/or the interactive controls 110. For example, the input component 502 may receive driving information regarding automobile 102 as described above, control commands from the interactive controls 110, and/or any other inputs. After receiving the inputs, the input component 502 may translate the inputs. For example, in some embodiments, some inputs received by the input component 502 can be encoded signals. In those embodiments, the component 502 may translate the received inputs according to one or more tables configured into user input component 502. The received inputs by the input component 502 may include geo-location information regarding a location of automobile 102.

The scene determination component 504 may be configured to select a scene file for presentation in a VR view based on a geolocation of automobile 102 as received by the input component 502. For example, the scene file may include a description of the virtual scene that includes geometries, viewpoints, textures, lighting, and shading information of different VR environments, virtual backgrounds, and virtual objects in the scene. In some implementations, a database of pre-rendered scene files can be stored. The pre-rendered scene files can represent realistic road conditions for a city, a region, a county, a country, a continent. For instance, pre-rendered scene files representing the entire state of California can be stored. Based on the geo-location of the automobile, the above-mentioned condition information can be retrieved by scene determination component 504 for a vicinity within the geo-location of the automobile 102. For example, the position information regarding other automobiles around the automobile 102 can be retrieved from a database storing live traffic information for all automobiles.

The control component 506 can be configured to translate control inputs as received by the input component 502 and generate view change information for implementing a new VR view based on the control inputs received. For example, the control component 506 may be configured to determine a change in a VR view based on an input indicating a rotation of a steering wheel. As illustration, the control component 506 may be configured to determine a change in the VR view to reflect the automobile 102 is turning left after a user such as user 202 has rotated the wheel to the left by certain degrees. As another illustration, the control component 506 may be configured to determine a change in the VR view to reflect automobile 102 is slowing down after the user 202 has stepped on the gas pedal. Other examples are contemplated.

The view determination component 508 can be configured to determine views of the VR environment for display on HMD 104 and/or display device 112. As described above, a view of the VR environment may correspond to a location in the VR environment and can be determined by the view determination component 508 based on the inputs received by the input component 502 and/or the view change determined by the control component 506. The view determination component 508 can be configured to generate view information.

The render component 510 can be configured to render one or more images representing a view determined by the communication component 510 and may modify the rendered images with the view information received from the view determination component 508. For example, without limitation, the render component 510 can render multiple images representing a 180 degree view of the VR view from a viewpoint corresponding to the user's position in the automobile 102 as described above shown in FIG. 2.

Figure 6:
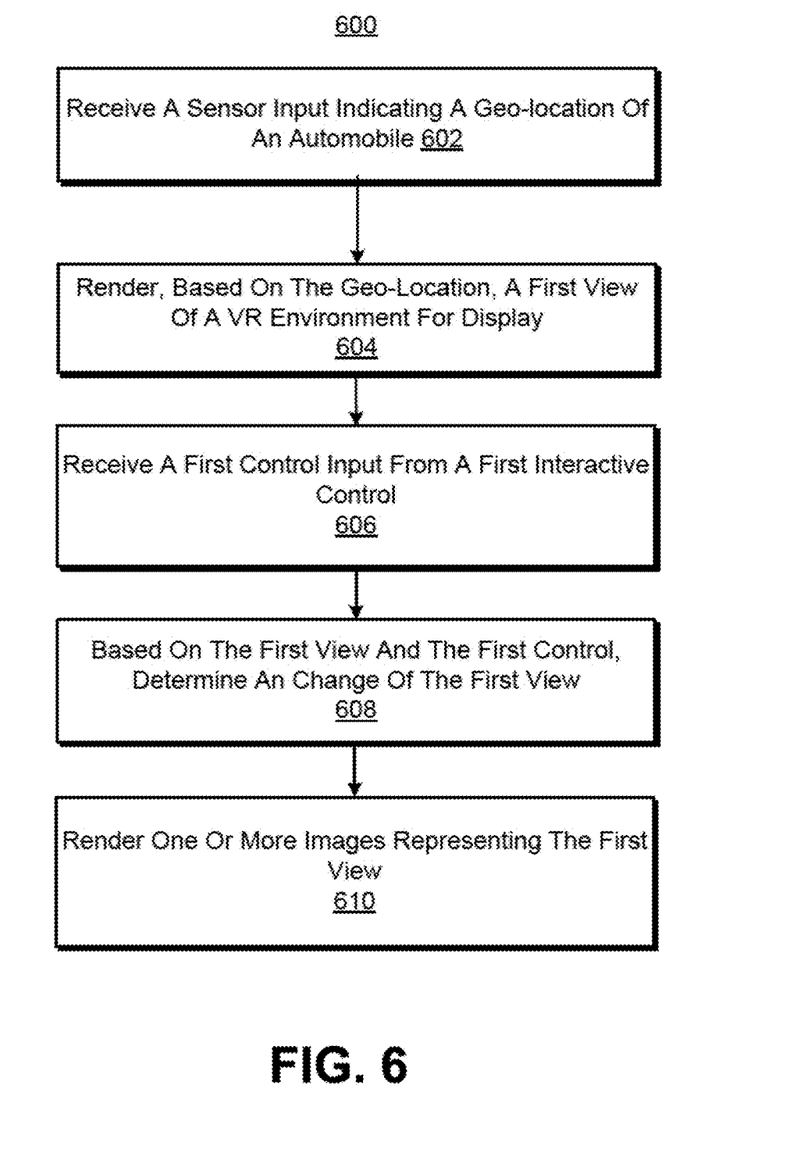
FIG. 6 illustrates an example of a process for facilitating remote driving with a virtual reality system.

FIG. 6 illustrates an example of a process 600 for facilitating remote driving with a virtual reality system. Process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 can be performed under the control of one or more computer systems configured with executable instructions and can be implemented as code (e.g., executable instructions, one or more computer programs, or one or more applications) executing collectively on one or more processors, by hardware, or combinations thereof. The code can be stored on a computer-readable storage medium, for example, in the form of a computer program comprising a plurality of instructions executable by one or more processors. The computer-readable storage medium can be non-transitory.

In some aspects, the process 600 can be performed by one or more of a server, such as server 108 described and illustrated herein.

At 602, a sensor input indicating a geolocation of an automatable can be received. In some examples, as in the example illustrated in FIG. 2, the sensor input received at 602 indicates automobile position change(s). In some examples, 602 can be performed by a input component the same as or substantially similar to the input component 502 described and illustrated herein.

At 604, a first view of a VR environment can be rendered based on the sensor input received at 602. Rendering of the first view may involve determining a location in the VR environment where the first view is taken (e.g., the view point), a size of the field of the view, a zoom ration of the view, a lens type for presenting the view, and/or any other aspects for determining the first view. The first view can be determined based on the geolocation indicated by the sensor input. For example, if the geolocation information indicates the car has moved from location A to location B, the location of the first view can be determined to correspond to the movement accordingly. In some examples, 604 can be performed by a rendering component the same as or substantially similar to the view rendering component 510 described and illustrated herein.

At 606, a first control input can be received from an interactive control. In some examples, 606 can be performed by a input component 502 the same as or substantially similar to the input component 502 described and illustrated herein.

At 608, an change in the first view determined at 604 can be made based on the first user input received at 604 and the first view itself. The view change may include presenting additional information in the first view, modify the first view in accordance with or at the instruction of the first user input, change the location of the first view, and/or any other view augmentation. In some examples, 608 can be performed by a view determination component 506 the same as or substantially similar to the view augmentation component 506 described and illustrated herein.

At 610, one or more images representing the first view determined at 608 can be rendered. In some examples, 610 can be performed by performed by a render component the same as or substantially similar to the render component 610 described and illustrated herein Referring to FIG. 7, a schematic diagram is shown of an example of a computer system 700. This system is exemplary only and one having skill in the art will recognize that variations and modifications are possible. The system 700 can be used for the operations described above. For example, the computer systems shown in FIG. 7 may be used to implement any or all of the initialization (e.g., face annotation, skull fitting, constraint creation) and stabilization (e.g., skin energy or error determination, nose energy or error determination) techniques and routines described herein.

Figure 7:
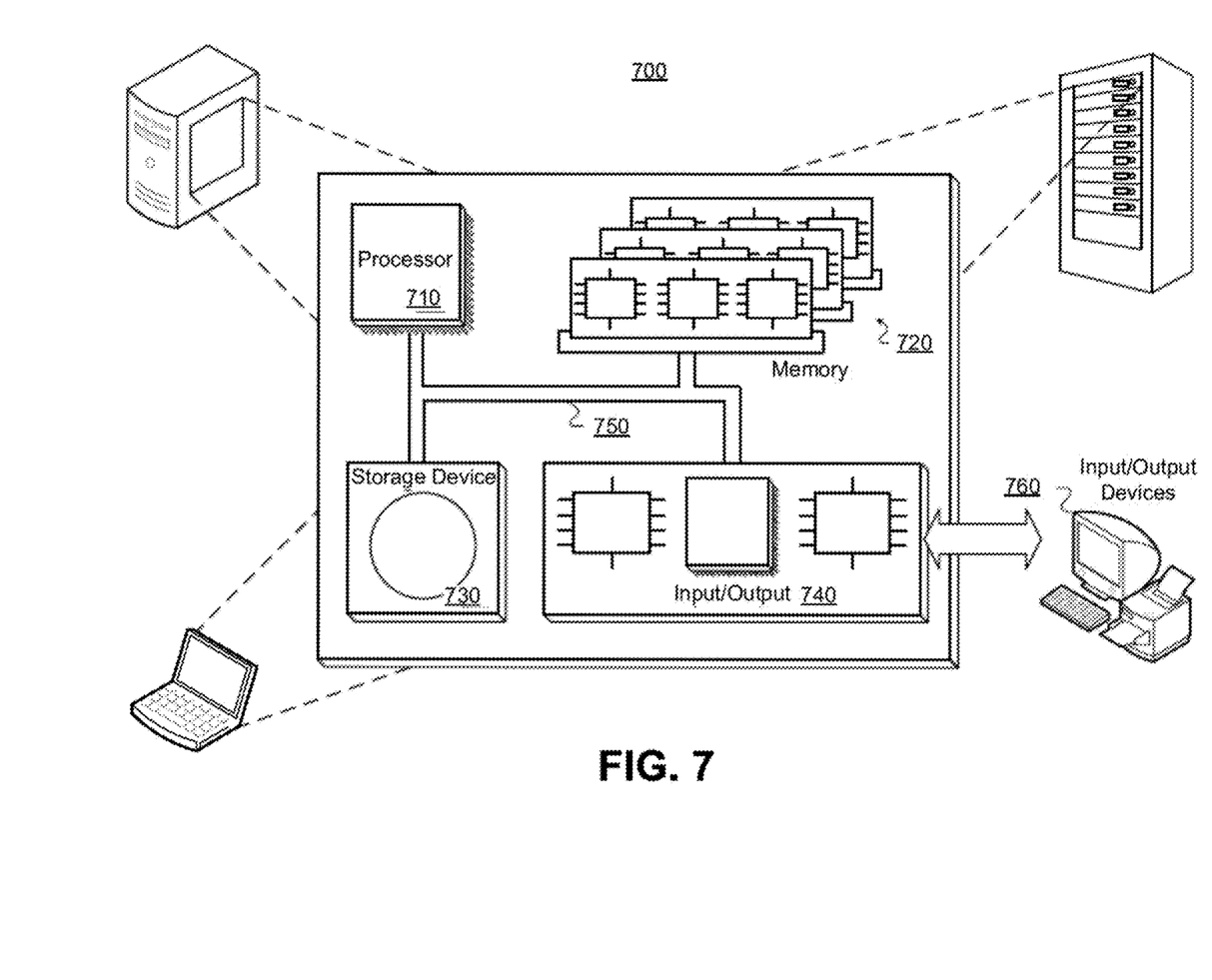
FIG. 7 is a block diagram illustrating an exemplary implementation of the server shown in FIG. 1.

The system 700 includes a processor 77, a memory 720, a storage device 730, and an input/output interface 740. Each of the components 77, 720, 730, and 740 are interconnected using a system bus 750. The processor 77 is capable of processing instructions for execution within the system 700. In one implementation, the processor 77 is a single-threaded processor. In another implementation, the processor 77 is a multi-threaded processor. The processor 77 is capable of processing instructions stored in the memory 720 or on the storage device 730 to provide graphical information via input/output interface 740 for display on a user interface of one or more input/output device 760.

The memory 720 stores information within the system 700 and may be associated with various characteristics and implementations. For example, the memory 720 may include various types of computer-readable medium such as volatile memory, a non-volatile memory and other types of memory technology, individually or in combination.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 760 provides input/output operations for the system 700. In one implementation, the input/output device 760 includes a keyboard and/or pointing device. In another implementation, the input/output device 760 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-7 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method for facilitating a user to remotely drive an automobile through a virtual reality system, the method comprising:
   receiving, by a server, from an automobile, a first geo-location of the automobile at a first time instance;
   based on the first geo-location received, rendering, by the server, a first view of a virtual reality environment reflecting an environment the automobile travels in at the first time instance, wherein the rendering of the first view of the virtual reality environment includes:
      obtaining, from a scene file database, pre-rendered scene files corresponding to the first geo-location, the scene files representing the environment the automobile travels in at the first geo-location; and
      constructing the first view of the virtual reality environment using the pre-rendered scene files;
   transmitting the first view of the virtual reality environment to a display device associated with the user;
   receiving, by the server, a first control input from a first interactive control device associated with the user;
   based on the first control input, determining, by the server, a second view of the virtual reality environment; and
   rendering, by the server, one or more images representing the second view.

2. The computer-implemented method of claim 1, wherein the first control input includes information indicating a translational or a rotational movement of the first interactive control device.

3. The computer-implemented method of claim 1, wherein the first interactive control device is a virtual steering wheel, a physical steering wheel, a physical brake pad, or a physical gas pedal.

4. The computer-implemented method of claim 1, further comprising receiving view information regarding a first view point of the first user into the environment of the road at the first geo-location; and wherein, the rendering of the first view of the virtual reality environment is further based on the view point information.

5. The computer-implemented method of claim 1, wherein the determination of the second view includes determining a change of the first view based on the first control input.

6. The computer-implemented method of claim 1, wherein the determination of the second view includes determining driving information regarding the automobile at the time instance.

7. The computer-implemented method of claim 1, wherein rendering the second view includes determining driving information regarding the automobile for presentation on a virtual instrument panel in the VR environment.

8. The computer-implemented method of claim 1, further comprising receiving, by the server, from a head mount device (HMD) neck movement information indicating a neck movement of a user that remotely drives the automobile, and wherein the second view is determined further based on the neck movement.

9. The computer-implemented method of claim 1, further comprising
   receiving, by the server, from a second automobile, a second geo-location of the second automobile at a first time instance;

based on the second geo-location received, rendering, by the server, a third view of a virtual reality environment reflecting a environment the second automobile travels in at the first time instance;

receiving, by the server, a second control input from a first interactive control device associated with the automobile;

based on the first control input, determining, by the server, a fourth view of the virtual reality environment; and rendering one or more images representing the second view.

10. A virtual reality system for facilitating a user to remotely drive an automobile, the virtual reality system comprising a processor configured to execute machine-readable instruction, when executed, causing the processor to perform:

receiving, from an automobile, a first geo-location of the automobile at a first time instance;

based on the first geo-location received, rendering, by the server, a first view of a virtual reality environment reflecting an environment the automobile travels in at the first time instance, wherein the rendering of the first view of the virtual reality environment includes:

obtaining, from a scene file database, pre-rendered scene files corresponding to the first geo-location, the scene files representing the environment the automobile travels in at the first geo-location; and constructing the first view of the virtual reality environment using the pre-rendered scene files and the condition information;

transmitting the first view of the virtual reality environment to a display device associated with the user;

receiving, by the server, a first control input from a first interactive control device associated with the user;

based on the first control input, determining, by the server, a second view of the virtual reality environment; and rendering one or more images representing the fourth view.

11. The system of claim 10, wherein the first control input includes information indicating a translational or a rotational movement of the first interactive control device.

12. The system of claim 10, wherein the first interactive control device is a virtual steering wheel, a physical steering wheel, a physical brake pad, or a physical gas pedal.

13. The system of claim 10, wherein the machine-readable instructions are further configured to cause the processor to perform receiving view information regarding a first view point of the first user into the environment of the road at the first geo-location; and wherein, the rendering of the first view of the virtual reality environment is further based on the view point information.

14. The system of claim 10, wherein the determination of the second view includes determining a change of the first view based on the first control input.

15. The system of claim 10, wherein the determination of the second view includes determining driving information regarding the automobile at the time instance.

16. The system of claim 10, wherein rendering the second view includes determining driving information regarding the automobile for presentation on a virtual instrument panel in the VR environment.

17. The system of claim 10, wherein the machine-readable instructions further causing the processor to perform receiving from a head mount device (HMD) neck movement information indicating a neck movement of a user that remotely drives the automobile, and wherein the second view is determined further based on the neck movement of the user.

18. The system of claim 10, wherein the machine-readable instructions further cause the processor to perform receiving, by the server, from a second automobile, a second geo-location of the second automobile at a first time instance;

based on the second geo-location received, rendering, by the server, a third view of a virtual reality environment reflecting an environment the second automobile travels in at the first time instance;

receiving, by the server, a second control input from a first interactive control device associated with the automobile;

based on the first control input, determining, by the server, a fourth view of the virtual reality environment; and rendering one or more images representing the fourth view.

* * * * *